United States Patent [19]
Smekens

[11] 3,722,330
[45] Mar. 27, 1973

[54] TIRE CHAIN APPLICATOR

[76] Inventor: Jan C. Smekens, 40 Corte Dorado, Greenbrae, San Rafael, Calif. 94904

[22] Filed: Mar. 29, 1971

[21] Appl. No.: 129,099

[52] U.S. Cl..................................81/15.8, 29/428
[51] Int. Cl...................................B60c 27/06
[58] Field of Search ....81/15.8; 254/78, 77; 152/213, 152/217, 219; 29/428

[56] References Cited

UNITED STATES PATENTS

| 1,948,203 | 2/1934 | Costello | 254/78 |
| 2,505,724 | 4/1950 | Robbins | 81/15.8 UX |
| 2,990,737 | 7/1961 | Smith-Miller | 81/15.8 |
| 3,136,188 | 6/1964 | Smith-Miller | 81/15.8 |

FOREIGN PATENTS OR APPLICATIONS

| 79,457 | 8/1953 | Norway | 81/15.8 |

*Primary Examiner*—Granville Y. Custer, Jr.
*Assistant Examiner*—Roscoe V. Parker, Jr.
*Attorney*—Townsend & Townsend

[57] ABSTRACT

A tire chain applicator for automatically closing at least the inboard chain strand on a vehicle wheel. A first holder is placed over the tire periphery and ends of the chain are secured to the holder to pull the chain over the tire upon rotation of the wheel. A second holder is secured to the other chain end and can be pivotally supported on a portion of the first holder so that a hook on one end of the inboard strand can be pivoted into engagement with a closed link on the other end of the inboard strand. The readily accessible outboard strand of the chain is tightened, closed and conventionally locked to firmly engage the hook and the link on the inboard strand.

24 Claims, 13 Drawing Figures

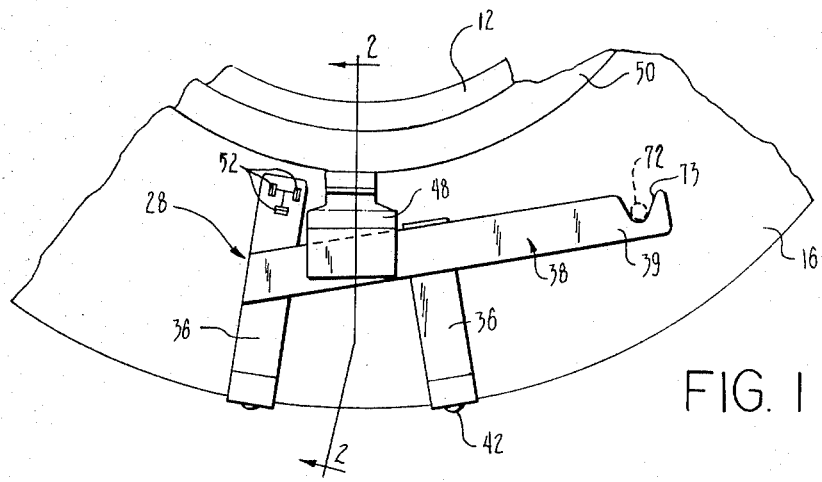
FIG. 1
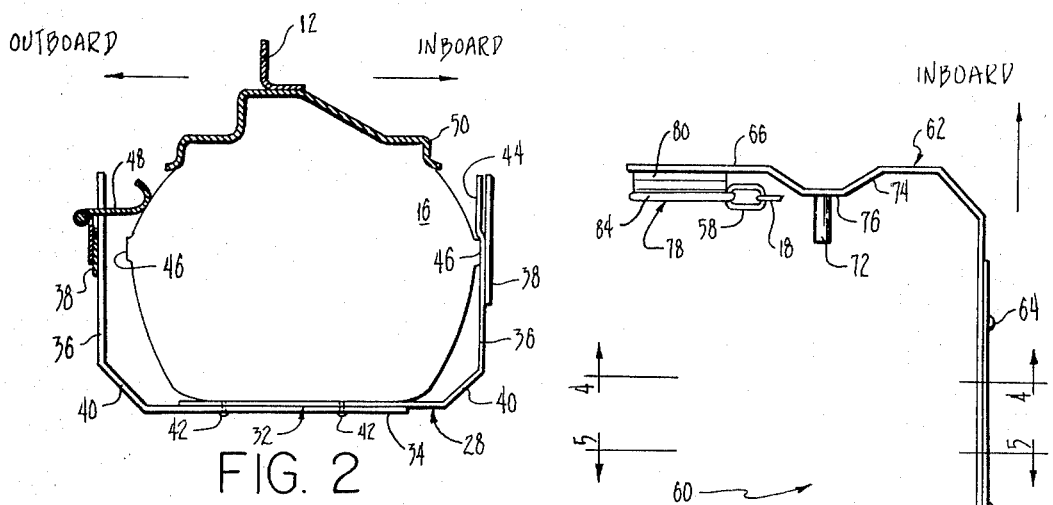
FIG. 2
FIG. 3
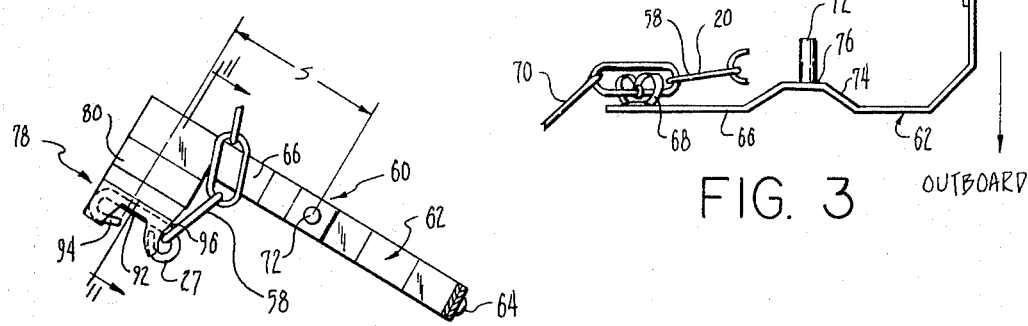
FIG. 4
INVENTOR.
JAN C. SMEKENS
BY Townsend and Townsend
ATTORNEYS INVENTOR.
JAN C. SMEKENS
BY *Townsend and Townsend*
ATTORNEYS

TIRE CHAIN APPLICATOR

BACKGROUND OF THE INVENTION

Various attempts have been made to reduce the chore of mounting tire chains by eliminating the need for manually placing the chains about the tire and thereafter manually closing the chain before driving on. Prior art approaches to automatically or semi-automatically mounting tire chains had three main objectives. First, to wrap the chain around the tire, secondly to automatically engage the ends of both the inboard and the outboard chain strands and, thirdly, to lock both strands once their ends have been interconnected.

A variety of devices capable of accomplishing these objectives with a greater or a lesser success are known. As a result of the inability of a chain to maintain its own shape, the lack of fixed reference points and the curved tire surface over which the chain must be applied have made prior art chain applicators complicated at best and at times resulted in mechanical nightmares. The applicators were expensive to construct, bulky, heavy and required substantial skill in their use. These factors outweighed the benefits derived from them, namely to eliminate the cold, wet and dirty task of applying chains so that prior art tire chain applicators have not become accepted to any appreciable extent.

SUMMARY OF THE INVENTION

The present invention provides a tire chain applicator which is simple to construct, has few components and is, therefore, inexpensive. It is relatively small, lightweight and easily used, all attributes designed to assure its general and widespread use.

Conceptually, the main objective of the chain applicator of the present invention is to wrap the chain about the tire and thereafter interlock the inboard strand of the chain only. The outboard strand, being readily accessible, can be easily manually closed. The applicator of the present invention, though adapted for use with all types of chains, is particularly well adapted for use with recently developed tire chains in which only one of the strands, namely the outboard strand, is locked while the inboard strand is merely closed through the interengagement of a closed chain link and an open, rigid hook. Thus, in contrast to the prior art, the chain applicator of the present invention is primarily designated to interengage the closed link and open, rigid hook. It therefore performs substantially fewer and less complicated functions than prior art chain applicators. As a result, its lesser size, weight and cost as compared to prior art applicators are truly significant.

In spite of the simplifications in the construction and functioning of the applicator of the present invention as compared to prior art applicators, it performs all necessary and difficult tasks encountered when applying tire chains to a vehicle on the road. The present invention eliminates the need for lifting the car and/or for crawling under the car to position both hands of the operator on the inside of the vehicle wheel so that he can close the inside chain strand. The only manual operation required of the operator is to close the outboard strand. That strand is readily accessible to the operator at a place where practically no soiling of the hands is encountered.

Generally speaking, a tire chain applicator constructed in accordance with the present invention is for use with chains having inner and outer longitudinal, laterally spaced and substantially parallel chain strands interconnected by transverse lengths of chain, ends of the inner strands being defined by a closed link end and an open hook, respectively. Cradle means embraces the periphery of the vehicle tire for rotation therewith and includes means for securing first ends of the strands to the cradle means so that upon rotation of the tire and chain is pulled over the tire periphery. Means are provided for positioning one end of the inside strand so that it is disposed in a predetermined first plane and a fixed relative position on the cradle means. Shuttle means includes means for connecting the other end of the chain thereto and means for positioning the other end of the inside strand in a second plane and a fixed relative position on the shuttle means. Locating means defined by the cradle means and the shuttle means support the shuttle means on the former after the chain has been pulled over and around the tire and positions the first and second planes substantially perpendicular with respect to each other and so that the plane of the hook intersects the plane of the link at about the center of the link. The applicator also includes means permitting pivotal movements of the shuttle means about a pivot axis spaced from the inside strand secured to the shuttle means a distance substantially equal to the distance between the pivot axis and the inside strand end secured to the cradle means. Pivotal movement of the shuttle means thereby interengages the closed link and the hook for securing the ends of the inside strand to each other.

The closed link and the hook are releasably engaged by springs which maintain them in position and permit the ready withdrawal of the cradle means and the shuttle means after the inboard strand has been closed. The cradle means is further provided with a spring biased clip which engages the tire and releasably secures the cradle means to the tire. Both the cradle means and the shuttle means are laterally adjustable in width to permit their use on tires of differing widths.

In the preferred embodiment of the invention, the link is releasably mounted to the cradle means while the rigid hook is releasably mounted to the shuttle means. To facilitate the ease with which the two are engaged, the link is spaced some distance away from the tire in a lateral direction and means is provided for automatically aligning the plane of the hook with the link center upon engaging the shuttle means and the cradle means via the locating means. Tedious manual alignment of the members and of the link and hook are thereby eliminated.

Although the present invention is described as being primarily directed to the automatic closing of the inboard chain strand only, if desired it can be adapted to simultaneously close the outboard chain strand which, thereafter, would merely need the manual interlocking of the outboard connection of the strand ends. The invention must therefore be considered to encompass the closing of the inboard chain strand only as well as the closing of the inboard and the outboard chain strands. However, practical considerations presently indicate that an effective closing of the inboard chain strand is all that is necessary for substantially eliminating the heretofore common and most objectionable tire chain mounting problems.

BRIEF DESCRIPTION OF THE DRAWINGS

FIG. 1 is a fragmentary side elevational view of a vehicle wheel having a tire chain mounting cradle constructed in accordance with the invention applied to the periphery of the tire;

FIG. 2 is a fragmentary section and is taken on line 2—2 of FIG. 1;

FIG. 3 is a plan view of a shuttle constructed in accordance with the invention and which cooperates with the cradle to secure the ends of at least an inboard strand of the chain to each other;

FIG. 4 is a side elevational view, in section, and is taken on line 4—4 of FIG. 3;

DESCRIPTION THE PREFERRED EMBODIMENTS

Figure 9:
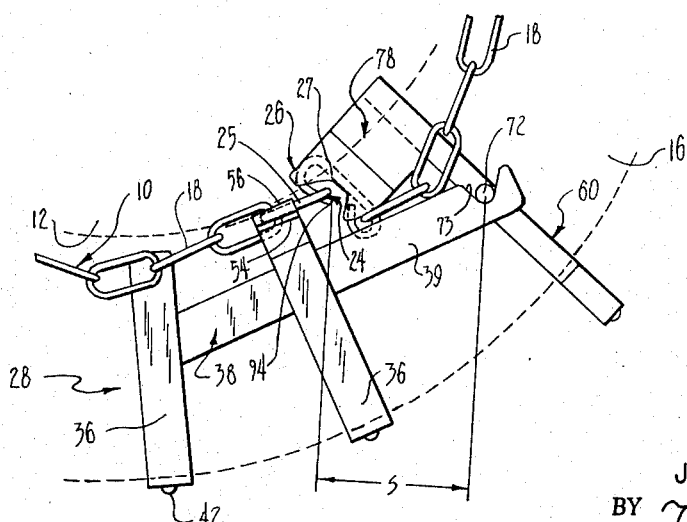
FIG. 9 is a fragmentary, enlarged elevational view of the inboard side of the vehicle wheel at the instant the ends of the inboard chain strand become engaged.

Referring first generally to the drawings, a tire chain 10 is illustrated laid out in front or behind a wheel 12, as will be described in greater detail below, of a vehicle 14 for mounting to a wheel tire 16. As is conventional, chain 10 is constructed of a pair of laterally spaced, parallel chain strands, an inboard strand 18 and an outboard strand 20 which are periodically interconnected by transverse chain sections 22. Inboard chain strand 18 terminates in ends 24 and 26 which are defined by a closed chain link 25 and an open, rigid hook 27 that is pivotally connected to a last chain link adjacent strand end 26 as best shown in FIG. 9. Outboard strand 20 terminates in a conventional closed link-locking hook combination which is not illustrated in detail.

Figure 11:
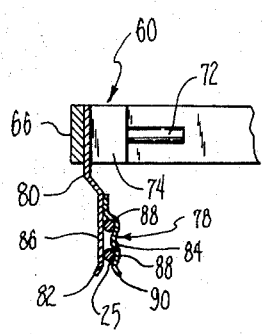
FIG. 11 is a fragmentary cross-sectional view of a portion of the shuttle mounting the inboard strand end and is taken on line 11—11 of FIG. 4.
Figure 12:
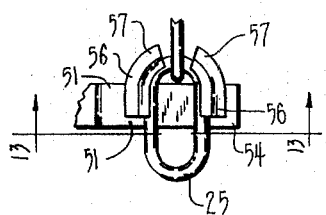

Referring specifically to FIGS. 1, 2 and 11, a generally U-shaped cradle 28 is placed over the periphery of tire 16 for connection of a first chain end 30 thereto. With the first chain end applied to the cradle rotation of wheel 12 pulls the chain over the tire periphery as more fully set forth hereinafter. Cradle 28 is preferably constructed of a pair of spaced apart U-shaped members 32 having a web 34 and transverse legs 36. Elongate support arms 38 are secured, e.g., welded to adjacent ends of legs 36 and extended a substantial distance past one of the legs. To permit use of the cradle on tires of varying widths, the length of webs 34 is adjustable as by providing a pair of overlapping, generally L-shaped brackets 40 adjustably secured to each other with bolts 42 disposed in elongate slots 43 of one of the brackets.

One of the brackets, the inboard bracket when the cradle is applied to the tire, includes an offset portion 44 for engaging beyond the widest point 46 of the tire. The other, outboard side of the cradle is fitted with a spring clip 48 hingedly mounted to a portion of the outboard support arm 38 disposed between outboard legs 36. The spring clip can be snapped in a clockwise direction, as viewed in FIG. 2, into engagement with a portion of the tire adjacent rim 50. This pulls the cradle in an outboard direction to assure engagement between the widest tire point 46 and the offset inboard portion 44 of the cradle and retains the outboard portion of the cradle to the tire. Thus, the cradle is securely mounted to the tire and rotates therewith.

The outboard side of cradle 28 further includes means such as clips 52 secured to a free end 53 of the outboard leg 36 remote from the support arm extension 39 for releasably attaching the last link of outboard chain strand 20 to the cradle. The precise positioning of the last link and the location at which the link is secured to the cradle is of no substantial importance when only the inboard chain strand is to be automatically secured in accordance with the invention.

Referring to FIGS. 9, 10, 12 and 13, closed link 25 of inboard strand end 24 must be precisely positioned on and secured to the cradle for its subsequent engagement with hook 27. For this purpose, the free ends of inboard leg 36 adjacent the support arm extension 39 is bent about 90° away from the cradle in an inboard direction to form a support plate 54 for the link. The plate is substantially narrower than one link length so that both ends of the link protrude past sides 51 of plate 54. Alternatively, if plate 54 is too wide to permit the protrusion of both ends of link 25, the plate can be slotted (not shown) to accommodate the next link. A pair of upwardly and outwardly flared spring retainers and locators 56 are mounted to plate 54 and include recessed portions 56 for receiving the link. The link is engaged by pushing it downwardly towards the plate which first spreads the springs and then snaps the link into the recesses whereby the springs firmly grasp, hold and position the link. The link is then pulled to the left, as viewed in FIGS. 9, 10 and 12, until it rests on inwardly curved portions 57 of retainers 56. An inclined biasing member such as a spring (not shown) mounted to plate 54 can also be provided to automatically move link 25 into engagement with curved portions 57 when it is inserted in retainers 56. Link 25 is now precisely positioned with respect to the cradle for its subsequent automatic connection with hook 27.

Referring to FIGS. 3 through 9 and 11, another end 58 of the chain is secured to a shuttle 60 that has a generally U-shaped configuration and is preferably constructed of a pair of L-shaped arms 62 adjustably secured to each other with bolts 64 engaging slots (not separately shown) to permit adjustment of the shuttle width. Free legs 66 are provided with means for securing chain end 58 to the shuttle. The outboard shuttle leg is provided with a spring 68 or the like for engaging the end of outboard chain strand 20 adjacent a conventional locking hook 70 of the outboard strand. The function of spring 68 is to retain the outboard strand end of the chain to the shuttle but it need not position that end at any particular location on the shuttle.

The inboard leg 66 of the shuttle mounts hook 27 for automatically engaging it with closed link 25 of the other inboard strand end. For this purpose the shuttle includes a pair of pivot pins 72 mounted to an inward protrusion 74 of legs 66 for support by and pivotal movements in slots 73 of support arm extensions 39. The protrusions extend inwardly of the legs a sufficient distance so that when interior faces 76 of the protrusions engage extensions 39 hook 27 mounted to the inboard leg is substantially aligned with the center line of link 25 mounted to cradle 28.

For mounting the hook, a hook retainer 78 is provided which comprises a bracket 80 secured, e.g., welded or riveted to the free end of inboard leg 66 and which has a generally Z-shaped configuration (as seen in FIG. 11). The bracket extends perpendicular to the leg and terminates in an outwardly flared end 82. A spring clip 84 is secured to the inwardly extending portion 86 of the bracket and includes bulges 88 and an outwardly flared end 90 so that the hook can be pressed between the inwardly extending portions and the spring clip and be positioned and held therebetween.

Retainer 78 positions the hook in a plane perpendicular to link 25 on cradle 28 when pivot pins 72 rest in slots 73 on the support arms extensions 39. In addition, hook 27 is substantially aligned with the center line of link 25.

To engage the hook and the link upon pivotal movements of shuttle 16 about pins 72, bracket 80 and spring clip 84 include cutouts 92 which expose open end 94 of the hook. As clearly illustrated in FIG. 4, the bracket and spring clip are further cut back at 96 to accommodate the last link of chain strand 18 to which hook 27 is pivotally connected.

Figure 10:
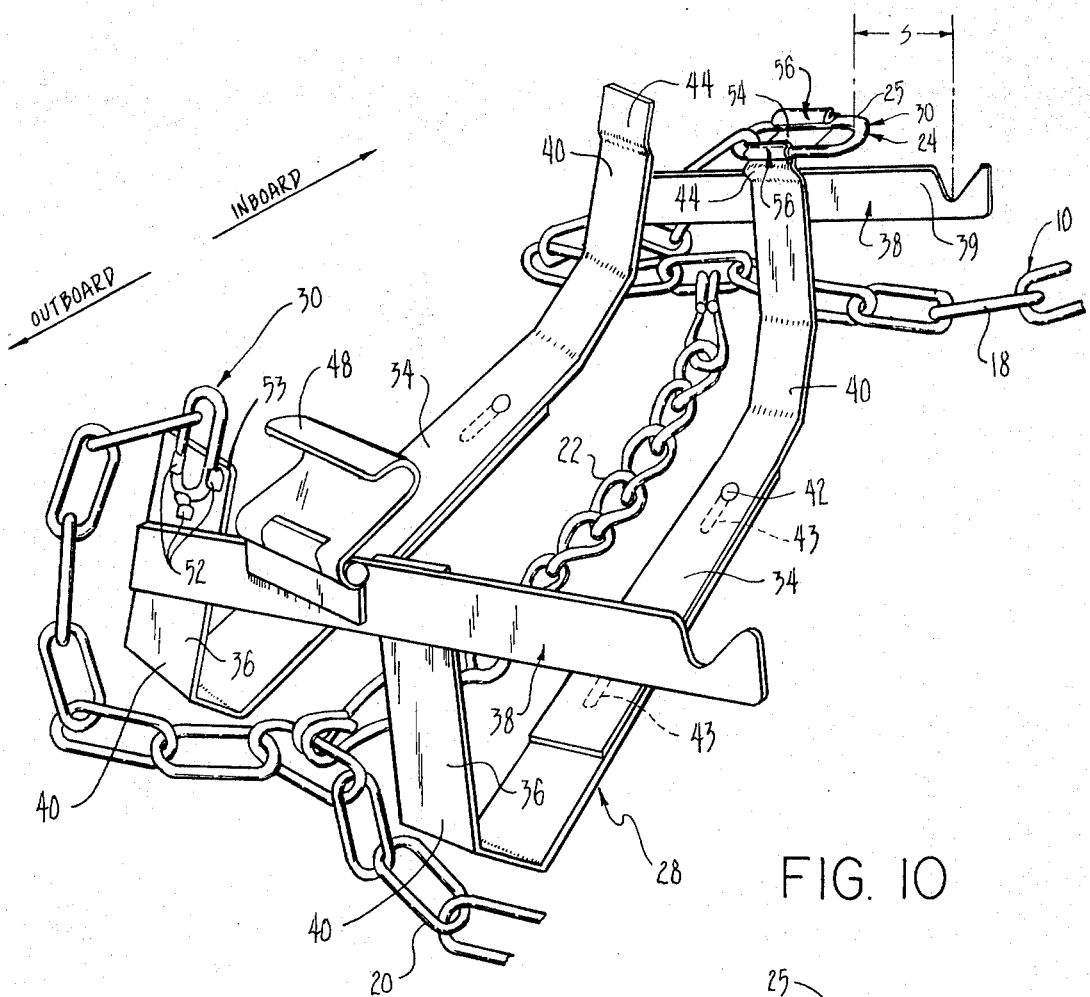
FIG. 10 is a perspective side elevational view of the cradle with an end of the chain secured thereto.
Figure 13:
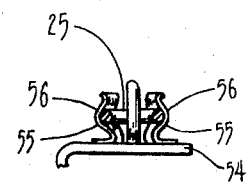
FIGS. 12 and 13 are more detailed plan and elevational views, respectively, of the connection between the inboard chain strand end link and the cradle.

Link 25 and hook 27 are engaged by pivoting pin 72 of shuttle 60 in slots 73 of cradle support arms extensions 39 when the spacing "S" between the center of the pins and open hook end 94 (FIG. 4) is equal or slightly greater than the spacing between the pin center, or the center of slot 73, and link 25 on cradle 28 plus the thickness of the link, or between the pin or slot center and the inside of the link (FIG. 10). If the spacing is as described, then pivotal movement of the shuttle in a counterclockwise direction, as viewed in FIG. 9, places the link and the hook in a mutually superimposed position. Thereupon, after lifting shuttle 60 to disengage pin 72 from slots 73, withdrawal of the shuttle to the right, as viewed in FIG. 9, engages the link and the hook. Further withdrawal of the shuttle pulls hook 27 from retainer 78.

Turning now to the operation of the chain mounting device of the present invention, and assuming that a chain 10 is to be mounted to the left rear wheel of the vehicle, the chain is first laid out behind wheel 12 and well aligned with the wheel. First end 30 of the chain, the end including link 25 on the corresponding inboard strand end 24, is connected to cradle 28 by pressing link 25 past springs 56 onto retaining plate 54 and pulling it to the left. The outboard end of the chain is connected to outboard legs of the cradle by inserting it in clips 52.

Next, chain end 58 is secured to shuttle 60 by clipping the lockable hook 70 on outboard strand to spring 68 and by pushing rigid hook 27 on the inboard strand of the chain into hook retainer 78. This automatically places hook 27 in the correct relative position on the shuttle. Keeping the chain ends on the outside of the cradle the latter is now pushed over tire 16 for positioning at about the 4 o'clock position on the wheel, and the chain and shuttle depending from the cradle are gathered closely adjacent tire 16 while being kept in alignment therewith.

Figure 5:
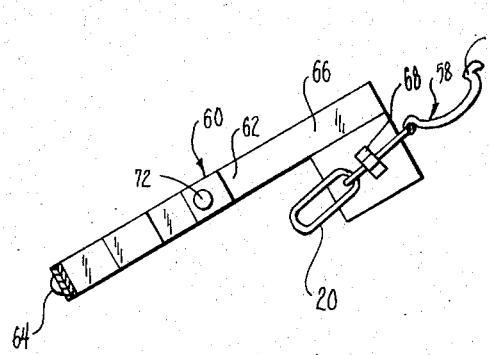
FIG. 5 is a view similar to FIG. 4 but is taken in the opposite direction along line 5—5 of FIG. 3.
Figure 6:
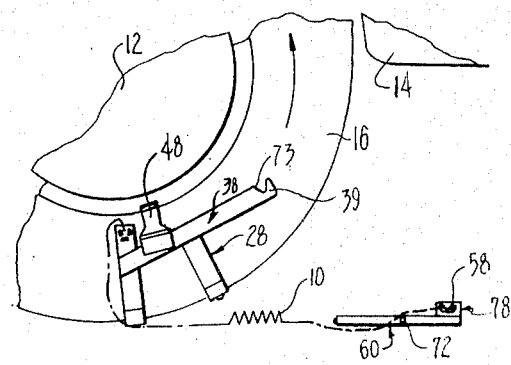
FIGS. 6 through 8 are fragmentary side elevational views showing the cradle, the shuttle and the tire chain in different positions during various stages of mounting the tire chain in accordance with the invention.
Figure 7:
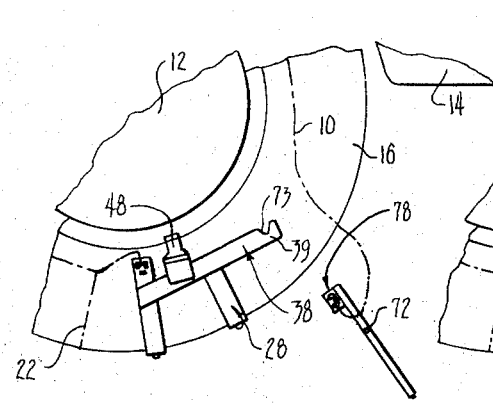
Figure 8:
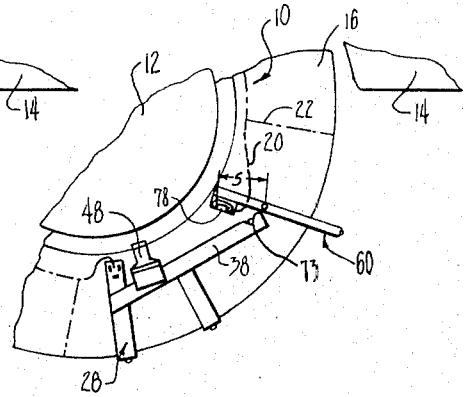

The vehicle is driven forward to a point in which the cradle is between about the 5 and the 6 o'clock position as illustrated in FIGS. 7 through 9. The chain is thereby wrapped over the tire periphery and support arms extensions 39 extend rearwardly of the wheel. Towards the end of the wheel rotation shuttle 60 is lifted off the ground and pivots under its own weight so that hook retainer 78 faces towards cradle 28 on the tire as illustrated in FIG. 7. Next, the shuttle is lifted and pivot pins 72 are placed into slots 73 on extensions 39 to thereby support the shuttle on the cradle and accurately position the two with respect to each other. For best results, the chain slack is adjusted by loosening the outboard chain strand, or moving it closer towards the tire periphery to facilitate the ease with which hook 27 and link 25 are engaged. The end of the shuttle is now grasped and the shuttle is pivoted in a counterclockwise direction, as viewed in FIGS. 8 and 9, until free end 94 of hook 27 extends into link 25. Thereafter, the shuttle is lifted off support arm extensions 39 and pulled to the right, as viewed in FIG. 9. This disengages inboard hook 27 from retainer 78 and the outboard and chain strand from spring 68 to thereby wholly remove the shuttle from the chain and the tire.

The outboard chain strand ends are now conventionally connected as by engaging the locking hook 70 with the last closed chain link at the other end of the outboard strand after that link has been removed from retention clips 52. It is advisable to tighten the outboard strand manually before closing the outboard hook and thereafter with commercially available resilient chain tighteners that are hooked to the outboard chain strand across the face of wheel 12. This maintains the inboard chain strand taut and link 25 and hook 27 in positive mechanical engagement.

Cradle 28 is removed from the wheel by pulling the former away from the latter, which disengages link 25 from plate 54. If the vehicle wheel rests on the cradle during the engagement of the inboard strand it might be necessary to move the vehicle a slight distance forward before the cradle can be removed. The tire chain has now been completely mounted without the need for lifting the vehicle above the road bed, crawling under the vehicle and similar objectionable tasks.

The chain can now be mounted to the right rear wheel in the same manner as described above except that initially the chain is laid out in front of the wheel and the car is backed up instead of driven forward to wrap the chain over the tire.

Although the preferred embodiment of the invention has been described above, it will be obvious to those skilled in the art that modifications and adaptations can be made without departing from the spirit of the invention. For example, the outboard strand end link and hook can be automatically engaged in the same manner in which the inboard link and hook are engaged by mounting the outboard link to the cradle in a horizontal position and the hook to the shuttle in a substantially vertical orientation. Furthermore, by using high strength chain tighteners, it can be possible to eliminate locking hooks on the outboard strand and substitute therefor the same rigid open hook utilized on the inside strand. In such a case, complete automatic closure of both strands with the device of the present invention is possible.

I claim:

1. A method for applying a tire chain to a vehicle wheel, the chain having a pair of spaced apart, parallel chain side strands intermittently interconnected by a plurality of chain sections, the ends of a strand being defined by a closed chain link and an open hook, and for closing at least said strand, the method comprising the steps of: securing ends of the chain to a first chain holder, the securing step including the step of maintaining one of the closed link and hook in a predetermined, fixed position relative to the holder, applying the holder to the wheel periphery so that a strand is positioned on each side of the wheel, rotating the wheel through about one revolution to thereby drape the chain over the wheel periphery, releasably connecting the other one of the closed link and hook to a second chain holder, rotatably supporting the second holder on the first holder at a point spaced from the link or hook secured to the first holder a distance about equal to the distance between the closed link or hook secured to the second holder and the axis of rotation of the second holder, and pivoting the second holder while so supported by the first holder until the closed link and hook are in mutual engagement connected and said strand is closed.

2. A method according to claim 1 wherein the first holder has a generally U-shaped configuration for placement over a peripheral portion of the wheel, and including the step of adjusting the effective width of the U-shaped holder to the width of the wheel, and wherein the step of securing the holder to the wheel periphery includes the step of biasing a retention member secured to the holder against the wheel.

3. A method according to claim 1 including the step of interconnecting the ends of the other strand by tightening the chain to apply tension to the interengaged link and hook, closing a locking hook arrangement on the ends of another strand, and locking the hook arrangement.

4. A method according to claim 1 including the step of aligning the second holder with respect to the first holder in an axial direction of the wheel before connecting the link and the hook by engaging opposing face portions of the first and second holder which are substantially perpendicular to the pivot axis of the first holder to thereby align the link and hook.

5. Apparatus for applying a tire chain to a tire on a vehicle wheel, the chain having laterally spaced strands, each strand having interengageable end portions, the apparatus comprising: a first chain holder for placement over the tire including means for securing the holder to the tire and means for connecting a laterally spaced end portion of the chain to the holder, the connecting means including means for placing at least one lateral end portion of the chain in a predetermined position with respect to the holder, engaging means for connection with laterally spaced end portions at the other end of the chain and including means for placing at least one lateral end portion at the other chain end on the same lateral side as the first mentioned portion in a predetermined position with respect to the engaging means, and means for supporting the engaging means on the holder and permitting pivotal movements of the engaging means about an axis spaced from the end portions at predetermined portions a distance so that pivotal movement of the engaging means about the axis guides at least a portion of one of the end portions into engagement with the other one of the end members to thereby close at least one chain strand.

6. Apparatus according to claim 5 wherein the support means include means permitting the withdrawal of the engaging means from engagement with the support means for separating the engaging means from the chain after the closing of the strand.

7. Apparatus according to claim 5 wherein the support means includes means for aligning the engaging means relative to the holder to thereby laterally align the chain end portions for their subsequent interengagement.

8. Apparatus according to claim 5 wherein the holder has a generally U-shaped configuration, and including means for varying the spacing between spaced apart legs of the holder for applying the holder to tires of varying widths.

9. Apparatus according to claim 8 including means for adjusting the effective width of the engaging means to correspond to the adjusted effective width of the holder.

10. Apparatus according to claim 5 including means for biasing a member connected to the holder against sides of the tire to thereby secure the holder to the tire.

11. Apparatus according to claim 10 wherein the member includes a surface for engaging a side of the tire, and including spring means releasably biasing the surface into engagement with the tire.

12. Apparatus according to claim 5 wherein one of the end portions comprises a closed link and the other one of the end portions comprises an open hook, the closed link and open hook being secured to respective ends of a common lateral chain strand, and including means for positioning the closed link so that it lies in a plane substantially parallel to the wheel axis when the holder is mounted on the tire, and means for positioning the hook so that it lies in a plane substantially perpendicular to the plane of the closed link when the engaging means is supported by the mounted holder.

13. Apparatus according to claim 12 wherein the means for holding the link and the means for holding the hook include means for frictionally restraining the link and the hook to prevent their accidental repositioning during the mounting of the chain and to facilitate the withdrawal of the holder and the engaging means after closure of said strand.

14. Apparatus according to claim 5 including means for connecting the end portions on the lateral chain strand disposed on the inboard side of the vehicle wheel only, and including means on the holder and on the engaging means for temporarily releasably securing ends of another, outboard lateral chain strand to the holder and the engaging means during application of the chain to the tire and until the inboard strand has been closed.

15. A tire chain applicator for use with tire chains having inner and outer longitudinal, laterally spaced and substantially parallel chain strands interconnected by transverse lengths of chain, ends of the inner strand being defined by a closed link and an open hook, respectively, comprising: cradle means for embracing the periphery of the vehicle tire and rotation therewith, means for securing first ends of the strands to the cradle means for pulling the chain over the tire when rotating the tire, means for positioning the end of the inside strand so that it is disposed in a predetermined first plane and a fixed relative position on the cradle means, shuttle means including means for connecting the other end of the chain thereto and means for positioning the other end of the inside strand in a second plane and a fixed relative position on the shuttle means, and locating means defined by the cradle means and the shuttle means and having means for supporting the shuttle means on the cradle means after the chain has been pulled around the tire, means positioning the two planes substantially perpendicular with respect to each other and so that one of the plane of the hook intersects the plane of the closed link at about the center of the link, and means permitting pivotal movements of the shuttle means about a pivot axis spaced from the inside strand end secured to the shuttle means a distance substantially equal to the distance between the pivot axis and the inside strand end secured to the cradle means, so that pivotal movements of the shuttle means interengages the closed link and the hook for securing the ends of the inside strand to each other.

16. A tire chain applicator for connecting ends of an inside strand of a tire chain, the inside strand ends being defined by a link and a hook member, respectively, the applicator comprising: a generally U-shaped cradle having an inner and an outer side for placement over a tire and rotation with the tire, means on the inside for releasably grasping and positively positioning one of the inside strand ends on the cradle, means for releasably holding an end of an outside chain strand on the outer side of the cradle, the cradle further including parallel, spaced apart support arms extending in a direction generally tangential from the cradle, a generally U-shaped shuttle having a web and extending therefrom, a pair of legs, the legs being spaced apart for placement adjacent and for lateral centering by the rearwardly extending support arms, the shuttle including means for releasably grasping and firmly positioning the other one of the ends of the inside strand, means for releasably holding the other end of the outside strand on the other leg, the cradle and the shuttle including means for supporting the shuttle on the support arms and permitting relative movement between the shuttle and the cradle along a fixed path bringing the link and the hook in an overlapping relation into mutual contact, the means for releasably grasping and firmly positioning the link and the hook further including means positioning the link and the hook in transverse planes and means for positioning the hook so that an open side of the hook faces the link when the shuttle moves along the path, whereby said movement of the shuttle along the path engages the hook and the link and withdrawal of the shuttle from the support arms and the tire connects the link and the hook and thereby closes the inside chain strand, and whereupon the outside chain strand ends can be disengaged from the shuttle and the cradle and manually secured to each other.

17. An applicator according to claim 16 wherein the hook comprises a substantially rigid hook pivoted on a last chain link adjacent one end of the inside strand, wherein the means removably securing and firmly positioning the hook includes means positioning the hook substantially parallel to the tire and means spring biased against the hook for frictionally engaging and holding the hook, and wherein the means for removably securing and firmly positioning the link includes means for positioning the link in a plane substantially perpendicular to the plane in which the hook is disposed, and spring biased means engaging and frictionally retaining the closed link in position until engaged with the hook.

18. An applicator according to claim 16 wherein the U-shaped cradle is defined by a web and laterally spaced clamping arms extending substantially perpendicularly away from the web for engaging sides of the tire and thereby retaining the cradle to the tire, and including means for adjusting the length of the cradle web for adapting the cradle to tires of different widths.

19. An applicator according to claim 18 including spring biased clip means connected to the cradle and positioned for engaging a widest portion of the tire spaced radially inward of the tire periphery for releasably securing the cradle to the tire.

20. An applicator according to claim 19 including means for adjusting the length of the shuttle web to adjust the shuttle width to the cradle width.

21. An applicator according to claim 16 wherein the fixed path is a substantially circular path, and wherein the motion permitting means defined by the support arms and the shuttle comprises notch means and a pivot pin means for placement in the notch means and pivotal movements therein.

22. An applicator according to claim 21 wherein the releasable grasping means for the link spaces the link some distance in an axial direction of the tire laterally away from the tire, wherein the spacing between the support arms substantially equals the spacing between clamping arms of the U-shaped cradle, wherein the spacing between the shuttle legs is substantially greater than the spacing between the cradle legs for aligning the plane of the hook with about the center of the closed link, and including means preventing substantial relative movements in the lateral direction between the shuttle and the cradle to maintain alignment between the hook and the link until they are connected.

23. An applicator according to claim 22 wherein the means for releasably grasping and positioning the closed link is mounted to the cradle and the means for releasably grasping and firmly positioning the hook is mounted to the shuttle.

24. An applicator according to claim 23 wherein the hook comprises a rigid hook connected to an end of the inside strand and having a hook end for engaging the link, and wherein the distance between the end of the closed link facing the hook and the axis of rotation of the pivot pin means about equals the distance between the axis of rotation and the hook end plus about the effective thickness of the chain link so that upon pivotal movement of the shuttle to engage the hook and the link, the hook end passes the link for substantially automatic gravitational connection of the link and the hook upon withdrawal of the shuttle.

* * * * *